United States Patent [19]

Zimmermann et al.

[11] 4,231,876

[45] Nov. 4, 1980

[54] REUSABLE COFFEE FILTER

[75] Inventors: Anton Zimmermann, Ennetbürgen; Albert Greutert, Sachseln, both of Switzerland

[73] Assignee: MAXS Aktiengesellschaft, Sachseln, Switzerland

[21] Appl. No.: 12,502

[22] Filed: Feb. 15, 1979

[30] Foreign Application Priority Data

Feb. 27, 1978 [DE] Fed. Rep. of Germany ....... 2808295

[51] Int. Cl.$^2$ .................... B01D 23/28; B65B 39/00; B67C 11/00

[52] U.S. Cl. .................... 210/232; 210/481; 210/482; 210/497 FB; 248/94

[58] Field of Search ................ 248/99; 210/455, 459, 210/460, 462, 463, 464, 473, 474, 477, 478, 479, 481, 482, 483, 497, 232; 222/189; 99/279, 278, 323, 304, 292

[56] References Cited

U.S. PATENT DOCUMENTS 2,166,980  7/1939  Welsh .................................. 210/455

FOREIGN PATENT DOCUMENTS 294311  2/1915  Fed. Rep. of Germany .......... 210/477

*Primary Examiner*—Frank Sever
*Attorney, Agent, or Firm*—Frederick E. Bartholy

[57] ABSTRACT

A coffee filter which may be used repeatedly is described. It comprises a funnel-shaped housing having an outlet port at the lower end. A filter of similar shape is fitted into the housing and is so dimensioned as to provide a clearance of between 0.2 to 1.5 mm. The filtering element is so dimensioned that the upper rim thereof forms a seal with the inner wall of the housing. The outlet port of the housing has a restriction in order to assume a continuous flow of the filtrate between the funnel-shaped housing and the filtering element.

3 Claims, 3 Drawing Figures

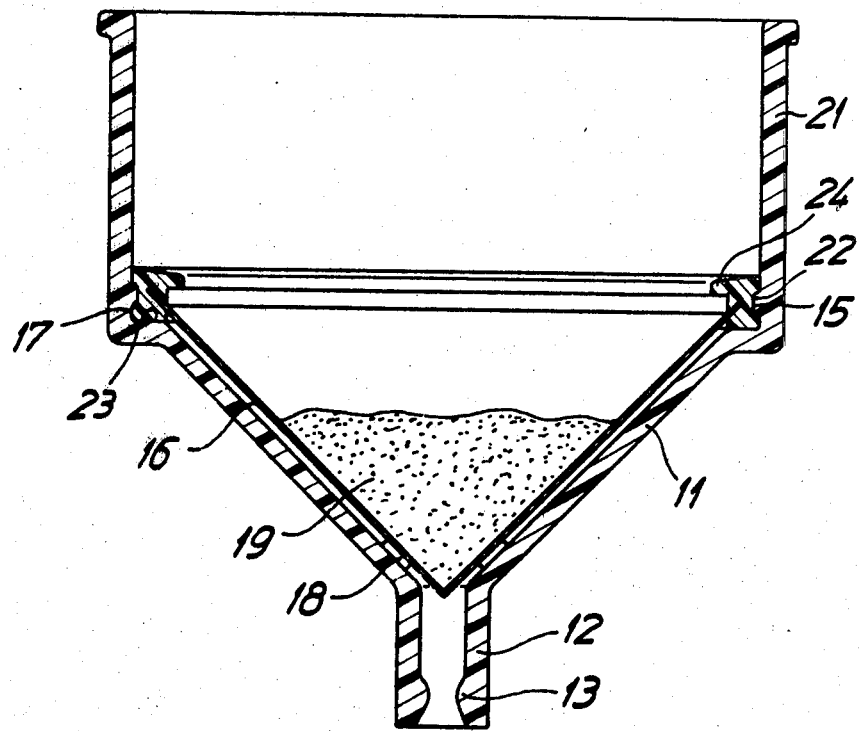

REUSABLE COFFEE FILTER

BACKGROUND OF THE INVENTION

This invention pertains to coffee makers and, more particularly, to coffee filters which may be used repeatedly without changing the filtering medium.

Various kinds of reusble coffee filters are already known. In one coffee filter (U.S. Pat. No. 3,935,112), a strainer made of a perforated metal sheet which is sealingly joined to the bottom of a hot water container is provided.

Another reusable coffee filter comprises a hot water receptacle, the bottom of which forms a plane sieve sheet.

BRIEF SUMMARY OF THE INVENTION

It is an object of the invention to provide a reusable coffee filter which has a higher filtration speed than the coffee filters hitherto known.

It is another object of the invention to provide a coffee filter which may be easily cleaned.

These and other objects are achieved by the features that the rim of the filtering element sealingly engages the upper region of the funnel and that the clearance between the filtering element and the funnel is, at most, 1.5 mm.

Preferably, the filtering element is made of a perforated metal foil.

Alternatively, the filtering element may be made of stiff plastic or wire netting.

In both cases, it is advantageous to mount the rim of the filtering element in the lower edge of a hot water vessel which may be placed on the funnel. By this, the rigidity, as well as inherent stability of the filtering element, are considerably increased.

The highest filtering speed is achieved when the clearance between the filtering element on the one hand, and the funnel on the other hand, is, at most, 1 mm.

Preferably, the minimum distance should not be less than 0.2 mm in order to prevent the filtering speed being reduced by the capillary effect which increases when the distance is reduced.

It is advantageous if the outlet port has such a small diameter that, during filtration, the liquid forms a continuous column. By this measure, the filtering speed is further increased.

The outlet port may be provided with restrictive means in order to prevent too rapid discharge of the filtrate and an interruption of the liquid column, especially in case of long and wide outlet ports.

According to a specific embodiment, the filtering element is removable from the funnel. By this, cleaning of the filter is facilitated since there are no inaccessible cavities.

According to a specific embodiment, the peripheral edge of the filtering element is embedded in a plastic bead, and the funnel is provided at its upper rim with a region which the plastic bead engages. This embodiment is simple in construction; provides for a sealed lodgement of the filtering element; and allows easy removal of the same from the funnel.

Preferably, the funnel is provided at its surface with a plurality of protrusions directed to the filtering element. By this means it is assured that any part of the filtering element has a constant clearance from the wall of the funnel so that optimum filtering characteristics may be achieved.

Preferably, the protrusions are provided in a region adjacent to the outlet port.

Alternatively, the filtering element may be attachable onto the rim of the funnel.

BRIEF DESCRIPTION OF THE DRAWINGS

The invention will now be described further, by way of example, with reference to the accompanying drawings, in which:

FIG. 3 is an axial section of a modified embodiment.

DETAILED DESCRIPTION OF A PREFERRED EMBODIMENT

Figure 1:
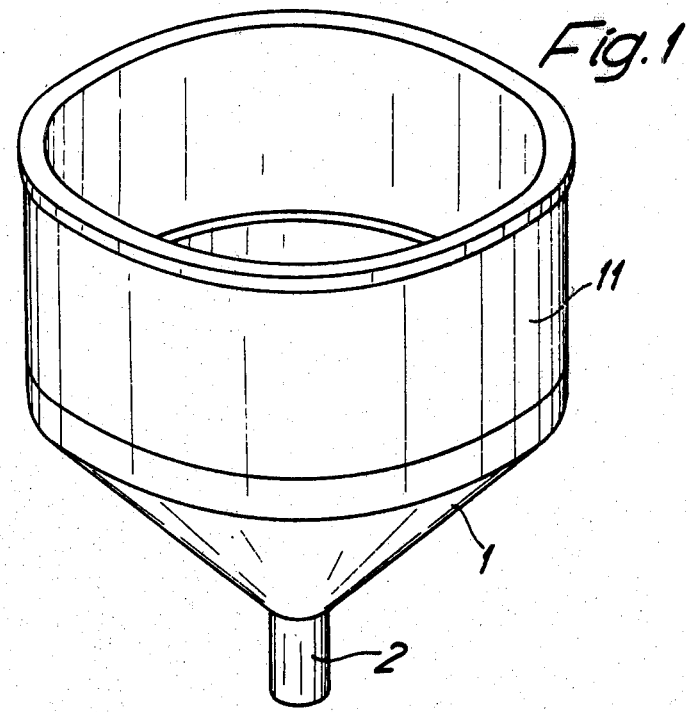
FIG. 1 is a perspective view of a coffee filter according to the invention.

Referring to the figures, the coffee filter comprises a cone-shaped funnel 1, the tip of which is open and ends in an outlet port 2 having, at its exhaust end, a restrictive portion 3 serving as a throttle means.

The upper rim 4 of the funnel is curved slightly inward so as to form a flat rib 5 at the inner surface of the upper rim 4.

The coffee filter further comprises a funnel-shaped filtering element 6 made of a perforated metal foil. The upper rim of the filtering element is embedded in a frusto-conical rim 7 of a hot water vessel 11 having an open top which is so dimensioned that it fits into the funnel 1, and is held in position by a peripheral groove 12 provided in its lower region into which the rib 5 fits.

The filtering element 6 has a shape similar to the funnel 1 and the frusto-conical rim 7 assures that the filtering element, when inserted, has a clearance of about 1 mm from the adjacent surface of the funnel 1.

In order to assume a constant clearance over the filtering surface, protrusions 8 are provided in the lower region of the funnel 1. These parts define the minimum clearance of the lower region of the filtering element and the funnel.

The filter element 6 is easy to separate from the funnel 1 by gripping the hot water vessel 11 and removing it from the funnel 1, for instance for the purpose of cleaning the filter.

In operation of the coffee filter, coffee powder 9 is placed into the filtering element, and hot water is then poured into the vessel 11 in the usual manner. The filtrate passes through the perforations 10 of the filtering element and forms droplets around the openings. The droplets increase in size until they come into contact with the inner surface of the funnel 1.

By the effect of surface tension and capillary action, after a short filtering period the droplets form a continuous layer which unexpectedly increases the filtering speed compared with known reusable coffee filters having a comparable surface. The filtrate passes into the outlet port 2, the inner diameter of which is so small as to assist in the formation of a continuous column of liquid in the same. The restriction 3 provided at the lower end of the outlet port 2 further favors the formation of a continuous liquid layer.

Figure 2:
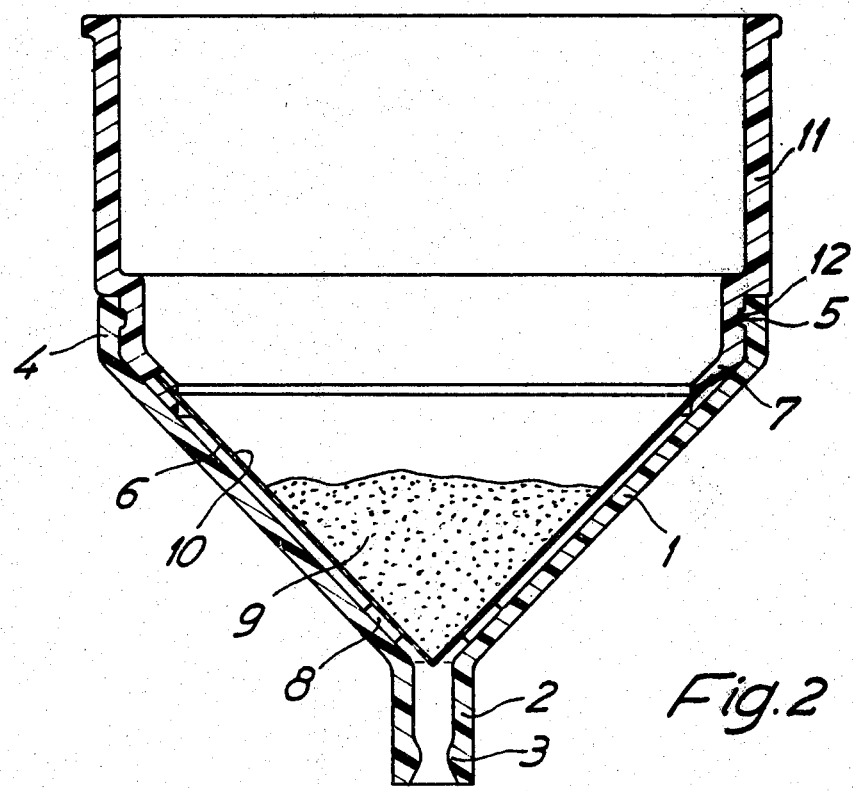
FIG. 2 is an axial section of the coffee filter of FIG. 1.

FIG. 3 shows a modified embodiment, wherein the reference numerals of elements similar to those of FIGS. 1 and 2 are indicated by the addition of ten to the numerals. In the coffee filter according to FIG. 3, funnel 11 and hot water vessel 21 form an integral part provided with a shoulder 23 at the junction point. A rib 15 is provided at the lower portion of the hot water vessel 21.

The upper rim of the filtering element 16 is embedded in a plastic ring 17 which is provided with a peripheral groove 22 and is so dimensioned as to fit into the hot water vessel 21 and engage the rib 15. For the purpose of facilitating removal of the filter elements, the plastic ring 17 is provided with a radially inwardly-projecting shoulder 24.

Especially good filtering characteristics are achieved if a metal foil is used for the filtering element having perforations which widen in the direction of flow.

The funnel and filtering element need not necessarily be conically shaped. Forms which narrow downwardly may also be used. The conical form, however, is to be preferred inasmuch as it is simple in construction and results in a surface of constant clearance between the filtering element on the one hand, and the funnel on the other hand.

What is claimed is:

1. A reusable coffee filter assembly for use in providing a filtrate of liquid such as coffee, said assembly comprising:

a cone-shaped funnel and a reusable filtering element positionable within said funnel;

coacting spacing means to critically space an inner surface of said funnel and an outer surface of said filtering element at a distance of between from 0.2 mm and 1.5 mm from each other when said filtering element is positioned within said funnel, said spacing means including an inwardly extending peripheral rib at an upper inner portion of said funnel, a plurality of spaced inwardly extending protrusions on a lower portion of said inner surface of said funnel adjacent a lower outlet port of said funnel, and a peripheral groove at an upper portion of said filtering element, said groove engaging said rib, and a minimal outer surface portion of said filtering element contacting said spaced protrusions to maintain said critical spacing between said inner surface of said funnel and said outer surface of said filtering element to provide a substantial filtering area in which a continuous layer of the filtrate is formed on said inner surface of said funnel and passes through said outlet port as a continuous column of liquid; and a throttling means in said outlet port, said throttling means being so dimensioned and spaced in said outlet port to control the flow of the filtrate to maintain said continuous layer of filtrate whereby a rapid filtering speed is attained.

2. The filter assembly of claim 1 wherein said filtering element is a perforated metal foil.

3. The filter assembly of claim 1 wherein said filtering element is a perforated rigid plastic.

* * * * *